Dec. 17, 1968 M. L. GRANBERG ET AL 3,417,284
ELECTROMAGNETIC GROSS BEAM POSITIONING SYSTEM
Filed Aug. 31, 1966
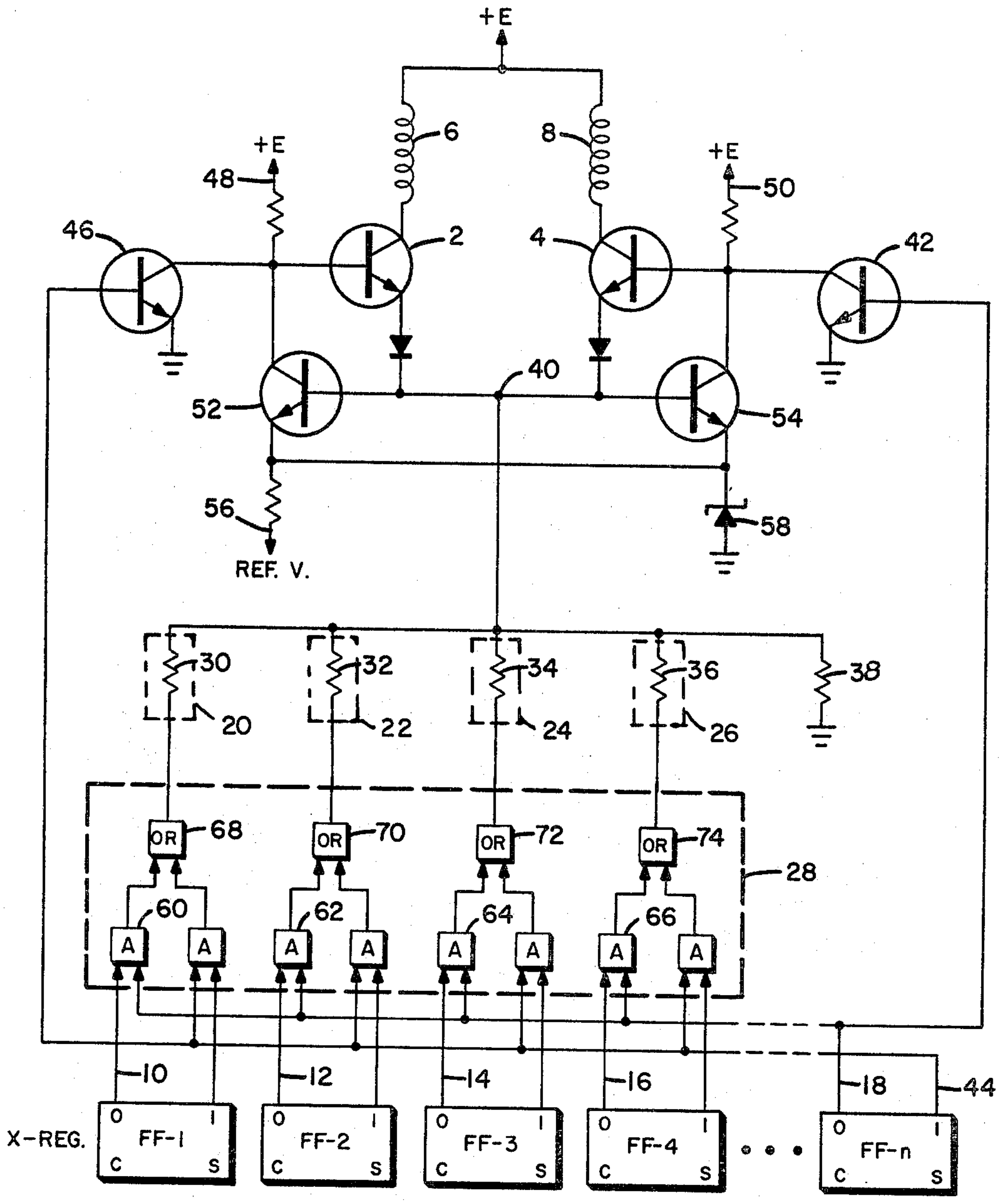
INVENTORS
MAURITZ L. GRANBERG
JEROME J. STOFFEL
BY Thomas J Nikolai
ATTORNEY 3,417,284
ELECTROMAGNETIC GROSS BEAM POSITIONING SYSTEM Mauritz L. Granberg, Minneapolis, and Jerome J. Stoffel, Farmington Township, Dakota County, Minn., assignors to Sperry Rand Corporation, New York, N.Y., a corporation of Delaware Filed Aug. 31, 1966, Ser. No. 576,276
9 Claims. (Cl. 315—27)

ABSTRACT OF THE DISCLOSURE

An electromagnetic beam positioning system for a cathode ray tube which has a push-pull deflection circuit having first and second yoke coils, and a logic circuit which initially couples an analog output signal representative of the beam position to a first one of the yoke coils for causing the beam to step in increments from one extreme edge of the tube toward the center and subsequently to the second yoke coil for causing the beam to step in a direction away from the center to the other extreme edge of the tube in response to changes in the analog output signal.

This is a continuation-in-part of application Ser. No. 569,182, filed Aug. 1, 1966, now abandoned.

This application relates to an electromagnetic beam positioning system which provides extremely linear deflection circuitry that is uneffected by varying values of load current for accurate positioning of the electron beam.

Most specifically, the invention relates to apparatus utilizing a push-pull yoke in combination with a single-ended deflection circuit arrangement to maintain high speed and good linearity for gross beam positioning while reducing the power and hardware requirements.

Many prior art cathode ray tube deflection systems such as that disclosed in commonly assigned copending application Ser. No. 436,174, filed Mar. 1, 1965, utilize a push-pull driving arrangement for the electromagnetic deflection system. Each stage of the register which stores the digital position of the beam has both a clear and set output. In a push-pull arrangement, the clear side of each of the stage drives one set of digital-to-analog converters while the set side of each stage drives a complementary set of digital-to-analog converters. Of course, each digital-to-analog converter has a metering resistor connected to its output with all of the metering resistors of one set of digital-to-analog converters connected in parallel to drive one-half of the push-pull yoke system. The true push-pull system, as is well known, has the advantage of circuit linearity. However, it has the disadvantages of increased power and hardware requirements.

In a single-ended system as used in the prior art, only one side or output of the stages of the register which stores the beam position in digital form is used to drive a single set of digital-to-analog converters. While this system has the advantage of reduced power and hardware requirements, it does not have the advantage of circuit linearity inherent in a true push-pull system.

The present invention overcomes the disadvantages of the prior art systems and obtains the advantages of reduced power and hardware requirements inherent in a single-ended arrangement while maintaining the advantage of circuit linearity inherent in the true push-pull system. This is accomplished by operating the storage register and its associated digital-to-analog converters in a single-ended arrangement while utilizing two current drivers alternately in combination with a push-pull yoke.

The figure shows the new and unique electromagnetic deflection system.

For display applications, it is important that the deflection circuitry used to supply current to generate a full raster on the display surface be extremely linear notwithstanding that the value of load current may vary anywhere from 0 amperes to 6 amperes. The present invention is an extremely linear single-ended deflection circuit driving a push-pull yoke that is capable of accurately positioning the electron beam under these conditions. This improved method of deflection is made possible by holding the voltage in the emitter leg of the current drivers fixed regardless of the value of the current ramp from the digital-to-analog converters. Since the X and Y deflection systems operate in an identical manner, only the X deflection system will be discussed in detail.

Considering the circuit of the figure, both deflection amplifiers 2 and 4 operate in combination with the two coils 6 and 8 of the push-pull yoke. Assume initially that the $n$–1 stages of the X-register which stores in digital form the beam position as well as the $n^{th}$ control stage are CLEARED and are producing outputs on lines 10 through 18 respectively. The outputs on lines 10–16 are coupled to digital-to-analog converters 20 through 26 respectively, which may include metering resistors 30–36 respectively, through logic circuit 28 and cause currents to flow through metering resistors 30 through 36 respectively. The output of the $n^{th}$ stage on line 18 enables AND gates 60, 62, 64 and 66 of logic circuit 28 which pass the signals on lines 10–16 to OR gates 68–74 respectively. These signals are received from OR gates 68–74 by D/A converters 20–26 respectively which cause currents to flow through metering resistors 30–36 respectively. These metering resistors have resistance values arranged in a geometric progression and, since all stages are CLEARED, a maximum value of current appears at junction 40. It is desired that this current flow through deflection amplifier 2 and coil 6 of the push-pull yoke to cause the beam to be positioned on the extreme left side of the cathode ray tube display surface. This is accomplished by utilizing the output on line 18 of the $n^{th}$ stage of the X-register to cause transistor 42 to conduct. When this transistor conducts, essentially ground potential appears at the base of transistor 4 which causes it to be cut-off. The complementary output of the $n^{th}$ stage of the X-register on line 44, 0 volts, is coupled to the base of transistor 46 thus causing it to be cut-off. With transistor 46 cut-off, the full voltage of source 48 is applied to the base of transistor 2 thus causing it to conduct and to enable the current at junction 40 to be applied to coil 6. Thus, the current flows through deflection amplifier 2 and coil 6 of the push-pull yoke causing the beam to be positioned at the left side of the display surface. As sequential stages of the X-register are SET, or the X-register stages incremented, the current available to yoke 6 will be decremented by discrete amounts depending upon the value of the metering resistors which cause the beam to step toward the center of the display surface. When the count in the $n$–1 stages of the X-register is maximum, $n$–1 stages are SET, the current available to yoke 6 is a minimum and the beam will be positioned in the center of the display surface.

When the next count is added to the stages of the X-register, the $n^{th}$ stage will be SET and the previous stages CLEARED. Thus, the signal on line 18 to the base of transistor 42 will be removed and a signal on line 44 will be applied to the base of transistor 46. The signal on line 44 to the base of transistor 46 will cause transistor 46 to conduct thus applying essentially ground potential to the base of deflection amplifier 2 causing it to be cut-off and preventing any further current flow through coil 6. At the same time, the removal of the signal from line 18 of the $n^{th}$ stage cuts off transistor 42 and enables the full supply voltage of source 50 to be applied to the base of transistor 4 thus causing it to conduct and enabling the current at junction 40 to flow through coil 8. Thus deflection amplifier 2 has been turned off and deflection amplifier 4 has been turned on. The count in the $n-1$ stages of the X-register will now continue to be incremented, or the $n-1$ stages sequentially SET, so that the current available at junction 40 is incremented in discrete steps. Since this current is now flowing through coil 8 of the deflection yoke, the electron beam in turn will be stepped from the center of the display surface toward the right side of the display surface. When the current through deflection amplifier 4 and coil 8 of the deflection yoke ultimately reaches a maximum value, the beam will be positioned at the extreme right side of the display surface. At this time, all $n$ stages of the X-register will be SET. The next pulse will CLEAR all $n$ stages. This means that the output signal from the $n^{th}$ stage on line 44 will be removed and will be present on line 18. The signal on line 18 is again coupled to the base of transistor 42 which causes it to conduct and apply essentially a ground potential to the base of transistor 4 thus cutting it off. Also, since the signal has been removed from line 44 to the base of transistor 46, transistor 46 is cut-off and thus the supply voltage 48 is again applied to the base of deflection amplifier 2 thus causing it to conduct. It can be seen then that deflection amplifier 4 has turned off and deflection amplifier 2 is turned on and since all $n$ stages of the X-register are in the CLEARED state, maximum current is again present at junction 40 which is coupled through deflection amplifier 2 and yoke 6 to cause the electron beam to retrace to the left side of the display surface.

As seen from the above description, when the $n$ stages in the figure store the binary value 11110, the electron beam is in the center of the CRT. When the next count is added to the stages shown, a binary value of 00001 is obtained. Again it will be seen that the beam is in the center of the CRT. Thus, two binary values represent the center position. To avoid this condition, resistor 38 is added between junction 40 and ground to provide a fixed bias current for said deflection coils. Its value is chosen such that when driver 2 is conducting current through coil 6, the beam will be one-half of a step off center on the left side of the CRT. Therefore, when driver 2 is shut off and driver 4 conducts, enough current will flow through coil 8 to cause the beam to be positioned one-half step off center on the right hand side of the CRT. Then as the X-register stages are incremented by unity, the beam continues to step across the face of the CRT and the two "zero" positions are eliminated.

As stated previously, the present invention has the advantages of reduced power and hardware requirements inherent in a single-ended arrangement while maintaining the advantage of circuit linearity inherent in a true push-pull system. This improved method of deflection can maintain the advantage of circuit linearity by holding the voltage fixed at junction 40 in the emitter legs of both deflection amplifiers 2 and 4 regardless of the value of the current ramp from the digital-to-analog converters. This means that the reference voltage cannot be connected directly to the base of the deflection amplifiers. If this were the case, as the collector-to-emitter current increased with the increase in the current ramp from the digital-to-analog converters, then the base-to-emitter current would also increase. The voltage drop from the base-to-emitter would also increase which would, in effect, be changing the reference voltage and, thus, nonlinearity would increase as the current from the digital-to-analog converters increased. To avoid this condition and to obtain the desired linearity, transistors 52 and 54 were added to the circuit with the reference voltage tied to their emitters. Consider now the operation of the circuit if the current is flowing from junction 40 through deflection amplifier 2 and coil 6. As the current through transistor 2 increases, the voltage drop across the base-to-emitter also tends to increase thus causing the voltage on the base of transistor 52 to tend to decrease. This causes transistor 52 to start to turn-off. This action causes the voltage on the base of transistor 2 from source 48 to tend to increase and thus holds the voltage on the emitter of transistor 2 constant. Since the reference voltage 56 and Zener diode 58 are also coupled to the emitter of transistor 54, deflection amplifier 4 is also controlled in the same manner to cause the voltage on the emitter leg of transistor 4 to be held fixed regardless of the value of the current ramp from the digital-to-analog converters.

Thus, in summary the electromagnetic deflection system of the present invention provides extremely linear deflection circuitry which is uneffected by varying values of load current for accurate positioning of the electron beam. Further, by utilizing the storage register and its associated digital-to-analog converters in a single-ended arrangement while utilizing the deflection coil in a push-pull arrangement, the advantages of reduced power and hardware requirements inherent in a single-ended arrangement are realized while maintaining the advantage of circuit linearity inherent in a true push-pull system. Thus, when all stages of the X-register are CLEARED, the digital-to-analog converters produce a maximum current which flows through one-half of the deflection coil and causes the beam to be positioned at one extreme edge of the display surface. As the stages of the X-register are sequentially SET, the beam moves in steps toward the center of the display surface. When it reaches a position that is one-half step off the center of the display surface, all $n-1$ stages of the X-register are SET. When the next pulse is applied to the X-register stages, the $n-1$ stages CLEAR, the $n^{th}$ stage SETS and control logic causes the current through the first half of the deflection coil to cease and couples the output of the digital-to-analog converters to the other half of the deflection coil positioning the beam one-half step off center on the right hand side of the CRT. As the $n-1$ stages of the X-register are now sequentially SET, the beam moves from the position one-half step off the center of the display surface to the right in steps toward the extreme right edge of the display surface. When $n-1$ stages of X-register have been CLEARED, the beam has reached the extreme right edge of the display surface and as soon as the last stage, $n$, is CLEARED, the beam immediately retraces to the opposite side of the display surface where the operation begins again.

It is understood that suitable modifications may be made in the structure as disclosed provided such modifications come within the spirit and scope of the appended claims. Having now, therefore, fully illustrated and described our invention, what we claim to be new and desire to protect by Letters Patent is.

What is claimed is:

1. An electromagnetic beam positioning system for a cathode ray tube comprising:

(a) means for producing an analog output signal representative of the beam position, (b) push-pull deflection circuit means for said cathode ray tube having first and second yoke coils, and (c) logic means initially coupling said output signal to said first yoke coil for causing said beam to step in increments from one extreme edge of said tube toward the center and subsequently to said second yoke coil for causing said beam to step in a direction away from said center to the other extreme edge of said tube in response to changes to said output signal.

2. The system of claim 1 wherein said analog output signal producing means comprises:

(a) a group of $n$ stages having first and second stable states and producing first and second digital outputs, $n-1$ of said stages storing a desired beam position in digital form and the $n^{th}$ stage forming a control stage, (b) $n-1$ digital-to-analog converters including $n-1$ corresponding metering resistors having resistance values forming a geometrical progression, one end of each said plurality of resistors being connected together to produce said analog output signal, and (c) means coupling the digital outputs of each of said $n-1$ stages to corresponding ones of the other ends of said metering resistors in said digital-to-analog converters for producing said analog output signal at said one end of said resistors.

3. The system of claim 2 wherein said coupling means comprises:

(a) $n-1$ OR gates each having its output coupled to a corresponding one of said digital-to-analog converters, (b) first means coupled to said $n^{th}$ stage, said OR gates and said $n-1$ stages for coupling said first digital output of each of said $n-1$ stages to a corresponding one of said OR gates when said $n^{th}$ stage is producing said first digital output, and (c) second means coupled to said $n^{th}$ stage, said OR gates and said $n-1$ stages for coupling said second digital output of each of said $n-1$ stages to a corresponding one of said OR gates when said $n^{th}$ stage is producing said second digital output.

4. The system of claim 3 wherein said first and second coupling means comprises:

first and second means of $n-1$ AND gates for alternatively coupling said first and second digital outputs of said $n-1$ stages to corresponding ones of said OR gates, each AND gate of said first group coupled to a respective one of said $n-1$ stages and to said $n^{th}$ stage for receiving said first digital output and coupling it to a corresponding one of said OR gates, each corresponding AND gate of said second group connected to a corresponding one of said $n-1$ stages and to said $n^{th}$ stage for receiving said second digital output from said stages and coupling it to said corresponding one of said OR gates.

5. The system of claim 2 wherein said logic means comprises:

(a) first and second gate means coupled in series with said first and second yoke coils respectively and in parallel with said analog signal producing means, and (b) first and second means connected to said $n^{th}$ control stage and to said first and second gate means respectively for opening and closing said first and second gate means in accordance with the state of said $n^{th}$ stage whereby said analog signal is coupled to only one of said first and second yoke coils depending upon the state of said $n^{th}$ stage.

6. The system of claim 5 wherein said first and second gate means comprises:

(a) first and second gating transistors respectively, each having an output electrode connected to a respective yoke coil, an input electrode connected to said one end of said resistors, and a control electrode coupled to said first and second opening and closing means respectively.

7. The system of claim 6 wherein said first and second opening and closing means comprises:

(a) third and fourth transistors respectively, each having a first electrode coupled to the control electrode of a respective gating transistor, a second electrode coupled to a fixed potential source and a third electrode coupled to said $n^{th}$ stage, said third transistor causing said first gate means to conduct only when said $n^{th}$ stage is in its first stable state and said fourth transistor causing said second gate means to conduct only when said $n^{th}$ stage is in its second stable state.

8. The system of claim 7 further including:

(a) voltage regulating means connected to said first and second transistors for holding the voltage at said one end of said resistors constant regardless of the magnitude of said analog output signal.

9. The system of claim 8 further including:

(a) a resistor coupled between a potential and said one end of each of said plurality of metering resistors for producing a bias current, said bias current operative when said metering resistors are producing no outputs to position said beam one-half of said incremental step on one side of the center of said tube when said first gate means is opened and one-half of said incremental step on the other side of the center of said tube when said second gate means is opened.

References Cited

UNITED STATES PATENTS

| | | | |
|---|---|---|---|
| 2,810,860 | 10/1957 | Mork | 315—27 |
| 3,325,803 | 6/1967 | Carlock et al. | 340—324.1 |

RODNEY D. BENNETT, *Primary Examiner.*

C. L. WHITHAM, *Assistant Examiner.*